United States Patent [19]

Cochard et al.

[11] Patent Number: 5,499,168
[45] Date of Patent: Mar. 12, 1996

[54] DEVICE FOR REGULATING LIGHT WIDTH OF HEADLIGHTS OF MOTOR VEHICLES

[75] Inventors: Roland Cochard, Morges; Frieder Heizmann, Denens, both of Switzerland

[73] Assignee: Robert Bosch GmbH, Stuttgart, Germany

[21] Appl. No.: 331,343

[22] Filed: Oct. 27, 1994

[30] Foreign Application Priority Data

Dec. 4, 1993 [DE] Germany .......................... 43 41 409.5

[51] Int. Cl.⁶ .................................................. B60Q 1/10
[52] U.S. Cl. ............................ 362/71; 362/32; 362/276; 362/277; 362/319; 362/420; 362/802; 180/169; 250/206; 340/600; 356/152.1
[58] Field of Search ...................... 180/167, 169; 250/206, 206.1, 206.2; 315/81–83; 340/600, 904; 356/139.1, 152.1; 362/32, 61, 66, 71, 276, 277, 319, 420, 425, 802

[56] References Cited

U.S. PATENT DOCUMENTS

| | | | |
|---|---|---|---|
| 4,768,135 | 8/1988 | Kretschmer et al. | 362/71 |
| 4,868,720 | 9/1989 | Miyauchi et al. | 362/71 |
| 5,039,217 | 8/1991 | Maekawa et al. | 340/904 |
| 5,193,894 | 3/1993 | Lietar et al. | 362/276 |
| 5,222,793 | 6/1993 | Davenport et al. | 362/32 |

FOREIGN PATENT DOCUMENTS 4122531  1/1993  Germany .

Primary Examiner—Ira S. Lazarus
Assistant Examiner—Alan B. Cariaso
Attorney, Agent, or Firm—Michael J. Striker

[57] ABSTRACT

A device for regulating a light width of headlights of motor vehicles comprises an adjusting device associated with one of the headlights, a transmitter which emits electromagnetic radiation to illuminate a region of a roadway located in front of the motor vehicle, an opto-electronic sensor which determines radiation emitted by the transmitter and reflected by the roadway and in dependence on the detected radiation produces signals, an evaluating device which processes the produced signals and controls the adjusting device for maintaining constant a light width of a beam emitted by the headlights. The transmitter in addition to the light beam of the headlight emits radiation and follows an adjustment of the light width of the light beam emitted by the headlights which is provided by the adjusting device, so that the region irradiated by the radiation emitted by the transmitter on the roadway has a small extension and with a correctly adjusted light width of the light beam emitted by the headlights is arranged at a predetermined distance from the motor vehicle, the evaluating device determining from the signals of the sensor a deviation of an actual distance of the region in front of the motor vehicle and when a deviation is detected controls the adjusting device for adjusting the predetermined distance.

19 Claims, 7 Drawing Sheets

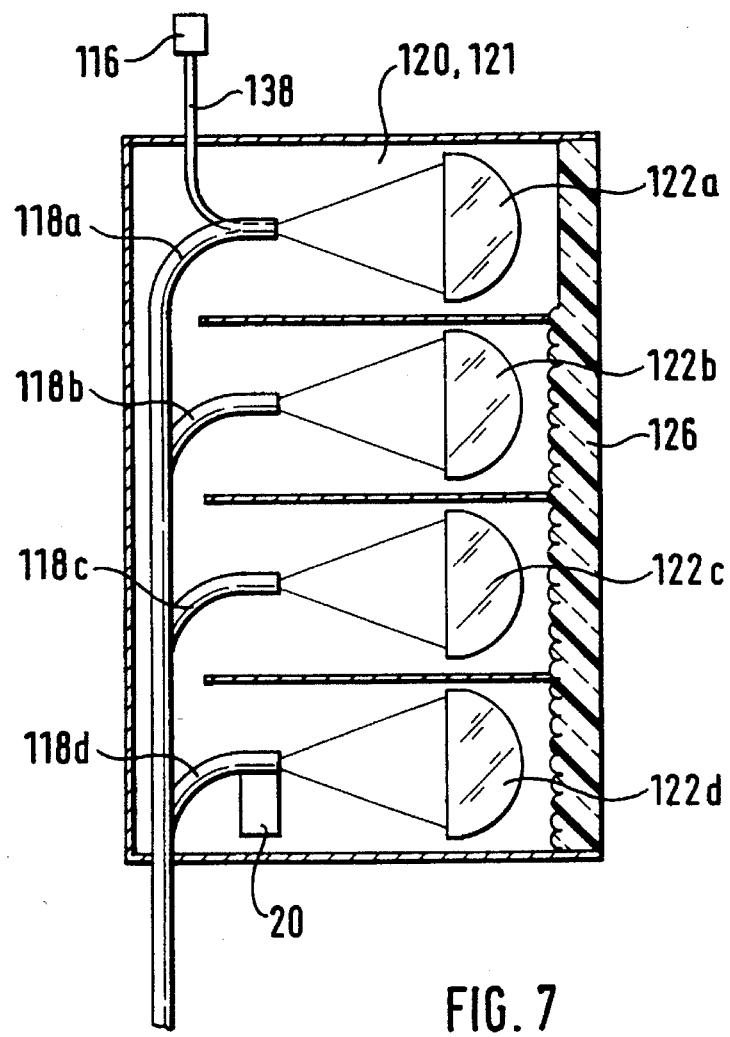
FIG. 7
FIG. 8
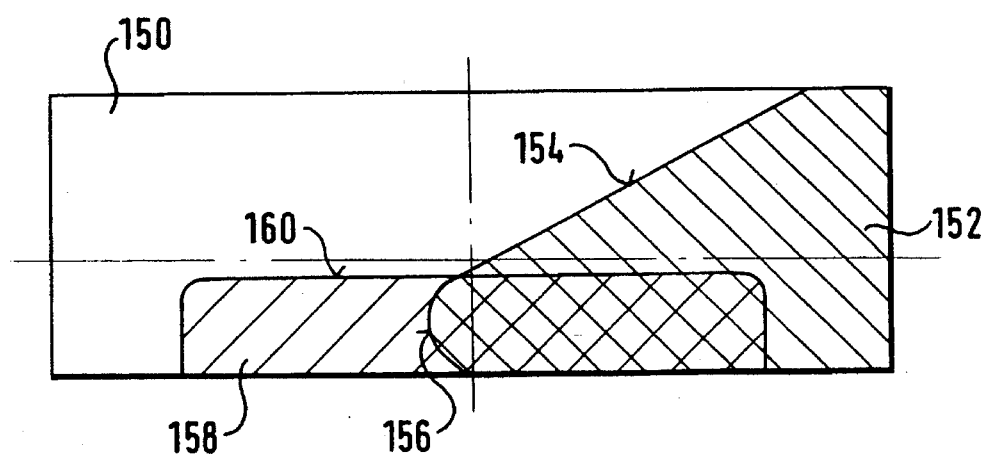

DEVICE FOR REGULATING LIGHT WIDTH OF HEADLIGHTS OF MOTOR VEHICLES

BACKGROUND OF THE INVENTION

The present invention relates to a device for regulating light width of headlights of motor vehicles.

One of such devices is disclosed in the patent document DE-A1 41 22 531. In this device an adjusting device is associated with a headlight and changes the light width of the light beam emitted by the headlight. Moreover, an opto-electronic sensor is provided which detects an illumination situation in front of the motor vehicle. A part of the light emitted by the reflector and reflected from the roadway which is generally is an electromagnetic radiation, is detected by the sensor. The headlight serves here as a transmitter which transmits the electromagnetic radiation in form of visible light. The sensor is connected with an evaluating device in which nominal values for the illumination situation in front of the vehicle are stored. The evaluating device compares the actual illumination situation detected by the sensor with the stored nominal illumination situation and when a deviation occurs, controls the adjusting device for illuminating the deviation. In the evaluating device either illumination intensity values in individual regions of the roadway in front of the motor vehicle are evaluated, or the position the bright-light limit of the light beam emitted by the headlight is determined. In both cases not only a qualitative but also a quantitative evaluation of the illumination situation is required, which needs an expensive evaluation process. For this reason different reflection properties of the roadway represent a substantial unreliable factor which makes the evaluation difficult.

SUMMARY OF THE INVENTION

Accordingly, it is an object of the present invention to provide a device for regulating light width of headlights of motor vehicles, which avoids the disadvantages of the prior art.

In keeping with these objects and with others which will become apparent hereinafter, one feature of the present invention resides, briefly stated, in a device for regulating a light width of headlights of motor vehicles, in which in accordance with the present invention the transmitter in addition to a light beam of the headlight emits a radiation and an adjustment of the light width of the light beam emitted by the headlight is performed by an adjusting device, the region of the roadway which is irradiated by the radiation emitted by the transmitter has a small extension and with a correctly adjusted light width of the light beam emitted by the headlight is arranged in a predetermined distance from the motor vehicle, an evaluating device determines from the signals of the transmitter the deviation of the actual distance of the region from the motor vehicle and indicates of available deviation the adjusting device is controlled for adjusting the predetermined distance.

When the device is designed in accordance with the present invention, it eliminates the disadvantages of the prior art and provides for the highly advantageous results.

More particularly, with the device in accordance with the present invention, due to the provision of the transmitter which in addition to the light beam emitted by the headlight also emits a radiation and due to the determination of the illuminated region which has a small extension only a distance determination is performed which allows a simple evaluation process. Moreover, the reflection properties of the roadway do not affect the evaluation since only the position of the limited region which is illuminated by the transmitter has to be determined.

In accordance with another feature of the present invention the electromagnetic radiation which is emitted by the sensor has a different wavelength than the light emitted by the headlight. It is thereby guaranteed that the light emitted by the headlight does not affect the process of evaluation.

In accordance with still a further feature of the present invention the region irradiated by the sensor is at least approximately point-shaped. In such a construction an especially accurate regulation of the light width is provided.

Still other features of the present invention are that the transmitter is integrated in the headlight, and the sensor is also integrated in the headlight. This provides for an especially simple construction of the device.

Still another feature of the present invention is that the transmitter has a beam bundling device by which the radiation emitted by the sensor is bundled, and the beam bundling device is formed as a lens element of a light distributor unit. In this construction the elements of the headlight are also utilized for the transmitter, so that the arrangement requires only a few additional parts.

Finally, in accordance with the further feature of the present invention, a lens element of a light distributor unit is utilized as imaging optics for the sensor. This also reduces the number of additional structural parts of the device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 5–7 are views showing various variants of the headlight in accordance with the second embodiment, wherein

FIG. 8 is a view showing a measuring screen illuminated by the headlight of the motor vehicle.

DESCRIPTION OF THE PREFERRED EMBODIMENTS

Figure 1:
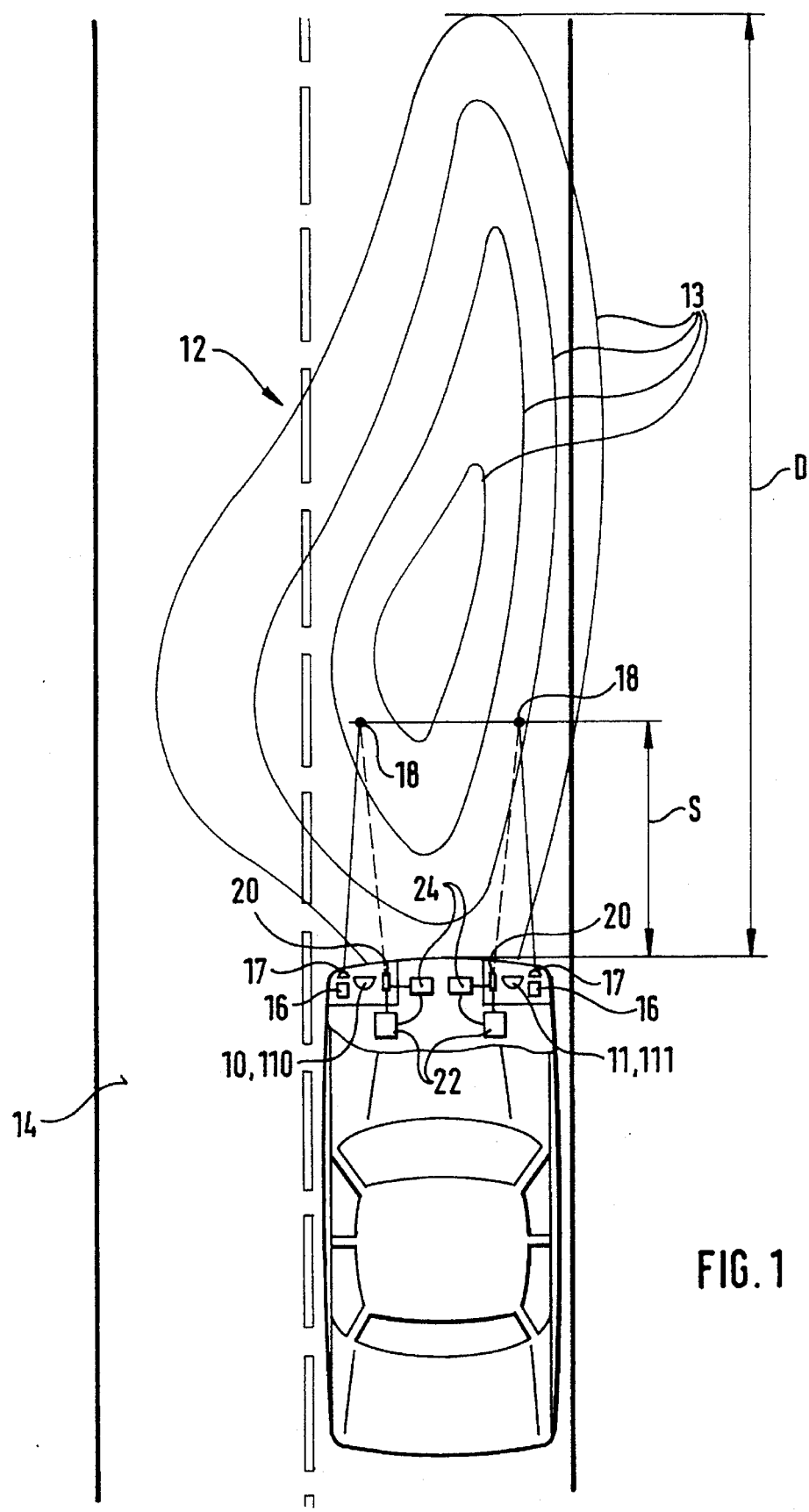
FIG. 1 is a view showing a motor vehicle with headlights and a device for regulating a light width of a light bundle emitted by the headlights with a roadway located in front of the vehicle, on a view from above.

A motor vehicle shown in FIG. 1 shows at its front side two headlights 10 and 11 mounted on a chassis. One headlight 10 is arranged on the vehicle for the opposite traffic and in the shown embodiment with a right side traffic is arranged at the left side of the vehicle while the other headlight 11 faces away from the traffic side and arranged on the vehicle at the right side. The headlights 10, 11 can be pure low beam headlights or combined low beam and high beam headlights. In operational position the low beam light is emitted by the headlight 10 as a light beam 12 which illuminates a region located in front of the motor vehicle and in particular the roadway 14. The light bundle 12 is represented in FIG. 1 by several isolux lines or in other words by lines of identical illumination intensity.

For preventing blinding of the opposite traffic, the light beam 12 has an upper bright-dark limit which operates so that the roadway 14 is illuminated in front of the vehicle only to a predetermined distance D. The range D of the light beam 12 emitted by the headlight 10 represents therefore the light width of the headlight. In the case of an alternating loading of the motor vehicle or during the traveling of the motor vehicle inclination changes of the motor vehicle occur, for example due to braking or accelerating maneuvers, and the light width of the headlight in the position of the bright-dark limit change. Therefore the front field of the roadway 14 is no longer sufficiently illuminated or a blinding of the opposite traffic is not sufficiently prevented. In accordance with the present invention a device for regulating the light width is provided, so as to maintain constant the light width during inclination changes of the motor vehicle.

The device for regulating the light width can be activated with the operation of the headlight 10 of the motor vehicle or constantly during the operation of the motor vehicle. It has a transmitter 16 emitting electromagnetic radiation which illuminates a limited region 18 of the roadway 14 located at a distance S in front of the motor vehicle. preferably, the sensor 16 produces a radiation spot with a small extension, and the radiation emitted by the transmitter 16 is bundled by an imaging optics or lens 17. The electromagnetic radiation can be visible light or can be located in invisible wavelength region, for example in infrared or ultraviolet region. The arrangement moreover has an optoelectronic sensor 20 which is sensitive to the electromagnetic radiation emitted by the transmitter 16 and which detects a part of the electromagnetic radiation emitted by the transmitter 16 which is reflected from the roadway 14 into the region 18.

The sensor 20 is connected with an evaluating device 22 in which the signals of the sensor 20 are processed. For providing a change in the light width of the light beam 12 emitted by the headlight 10, an adjusting device 24 is associated with the headlight 10. It is controlled by the evaluating device 20 in dependence on the results of the evaluation of the signals of the sensor 20. The transmitter 16 is arranged so that it performs an adjustment of the light width of the headlight 10 actuated by the device 24. In other words a fixed relationship is established between the distance S of the radiation spot produced by the transmitter 16 on the roadway 14 in front of the vehicle, and the light width D of the light bundle 12 emitted by the headlight 10. With correct adjustment of the light width D of the light beam 12 emitted by the headlight 10, the region 18 irradiated by the transmitter 16 is arranged at a predetermined distance $S_0$ from the motor vehicle. This value $S_0$ for the distance of the region 18 is supplied to the evaluating device 22. By the sensor 20 the evaluating device 22 is supplied with information about the actual distance S of the region 18 from the motor vehicle.

In the evaluating device 22 a comparison is performed between the actual distance S and the predetermined distance $S_0$ and with the occurring deviation, the adjusting device 24 is controlled so as to eliminate the deviation. This means that when the actual distance S is smaller than the predetermined distance $S_0$, the headlight 10 is adjusted by the adjusting device 24 so that the light width of its light beam is increased. On the other hand when the actual distance S is greater than the predetermined distance $S_0$, the headlight 10 is adjusted by the adjusting 24 so that the light width of its light beam is reduced. The transmitter 16 during the adjustment of the headlight 10 is guided together by the adjusting device 24, so that the actual distance S of the region 18 as the light width of the light beam of the headlight 10 is changed and a feedback is provided by the adjustment.

Figure 2:
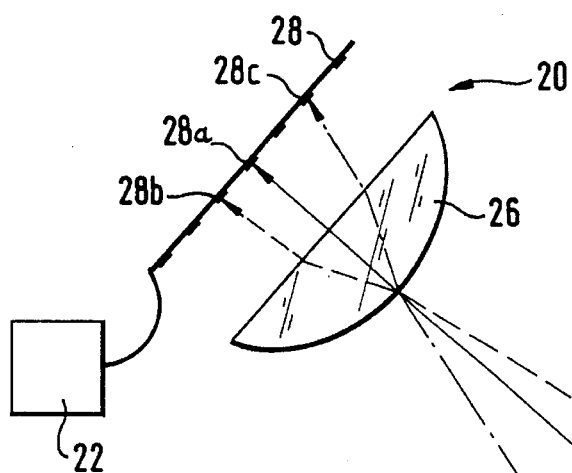
FIG. 2 is a view showing a sensor of the device and various illumination situations in front of the motor vehicle.
Figure 2:
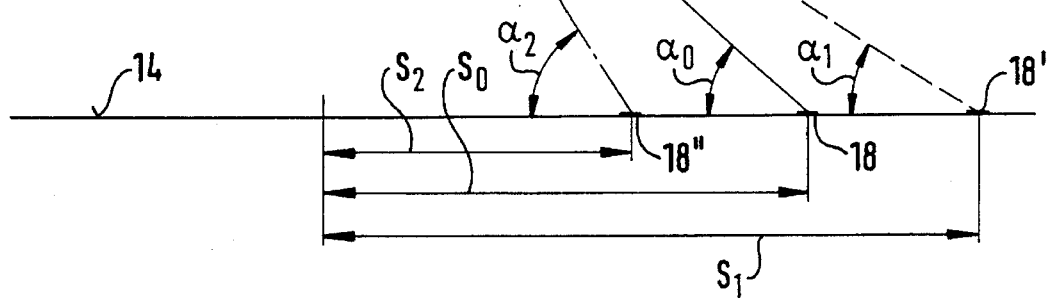

FIG. 2 shows the sensor 20 on an enlarged scale and illustrated an operational principle of the sensor. The sensor 20 has an imaging optics or lens 26 and one or several elements 28 which are sensitive for impinging electromagnetic radiation located in a wavelength region of the radiation emitted by the transmitter 16. Since no absolute distance measurements must be performed, but instead it is necessary only to determine whether the distance of the region 18 from the vehicle is correctly adjusted, it is sufficient to provide one element 28. The impinging radiation is projected through the lens 26 on one or several elements 28. The elements 28 can be formed as photoresistors, photodiodes, PSD (position sensing detector) or other suitable elements which react to occurring electromagnetic radiation with a change of their physical properties. In a photoresistor its electrical resistance changes in dependence on the impinging radiation, and the electrical resistance is simply determined by the evaluating device 22. In a photodiode a current flow is actuated by the impinging radiation which is also determined by the evaluating device 22. In a position sensing detector a current flow is actuated by the radiation impinging on the element 28 in dependence on its impinging point, which can be also evaluated in the evaluating device 22.

Hereinbelow an embodiment is described which utilizes several elements 28. The elements 28 are for example arranged in series over one another and each connected with the evaluating device 24. In accordance with a so-called triangulation process, it is possible to determine by the evaluation device from the signals of the elements 28 the distance of the region 18 from the motor vehicle, from which radiation impinges in the sensor 20. In the triangulation process the principle is utilized that the radiation which falls on the sensor from different distances falls at different angles in the sensor. The radiation reflected from the region 18 reaches the sensor 20 through the lens 26 and is deviated to one of the elements 28. The evaluating device 22 determines on which of the elements 28 the radiation impinges, which is possible due to the changes of physical properties, for example the electrical resistance of the element. In the evaluating device 22 the information is stored with which element 28 this characteristic change of the physical properties caused by the impinging irradiation occurs when the region 18 is located at a predetermined distance $S_0$ from the motor vehicle and thereby the light width of the light beam emitted by the headlight 10 is adjusted correctly. During the evaluation it is not necessary to consider the spatial expansion of the region 18 when this region as mentioned hereinabove is only a radiation spot with small size. The region 18 is shown in FIG. 2 in a solid line, and it is located at a forward distance $S_0$ from the motor vehicle. With this distance $S_0$ of the region 18 the radiation reflected by it under an angle $\alpha_0$ to the roadway onto the lens 26 passes through the lens and is deviated by the lens to the central element 28a. The evaluating device 22 determines in the above mentioned manner that the radiation acts on the element 28a and this is the element on which the radiation from the predetermined distance $S_0$ of the region 18 impinges. In this case there is a coincidence of the predetermined distance $S_0$ and the actual distance, so that a control of the adjusting device 24 by the evaluating device 22 is not necessary.

In the illumination situation identified in FIG. 1 with broken lines the region 18' is arranged at a distance $S_1$ from the motor vehicle which is greater than the predetermined distance $S_0$, so that also the light width of the light beam illuminated by the headlight 10 is too great. In this case the radiation reflected by the region 18' impinges under an angle $\alpha_1$ to the roadway which is different from the angle $\alpha_0$ onto the lens 26, passes through it and is deviated due to the angle $\alpha_1$ different from the angle $s_0$ in another way and acts on the element 28b. It is detected by the evaluating device 22 and determines the produced deviation. Then the adjusting device 24 is controlled by the evaluating device 22 for illuminating the deviation by the headlight 10 and is adjusted with it the transmitter 16 in such a way, that the distance S of the region 18' from the motor vehicle is adjusted to the predetermined distance $S_0$ and the light width of the light beam 12 emitted by the headlight 10 is reduced to the predetermined light width.

When from the transmitter 16 a region identified in FIG. 2 as 18" is irradiated, its distance $S_2$ from the motor vehicle is smaller than the predetermined distance $S_0$, so that the light width of the light beam 12 emitted by the headlight 10 is too small. In this case the radiation reflected from the region 18" impinges under an angle $\alpha_2$ which is different from the angle $s_0$ onto the lens 26 passes through it, and is deviated so that it impinges on the element 28c. This is detected by the evaluating device 22 and the produced deviation is determined. Then the adjusting device 24 is controlled by the evaluating device 22 for eliminating this deviation by the reflector 10, and with it the transmitter 16 is adjusted so that the distance S of the region 18" from the motor vehicle is adjusted to the predetermined distance $S_0$ and the light width of the light beam 12 emitted by the headlight 10 is increased to the predetermined light width.

Figure 3:
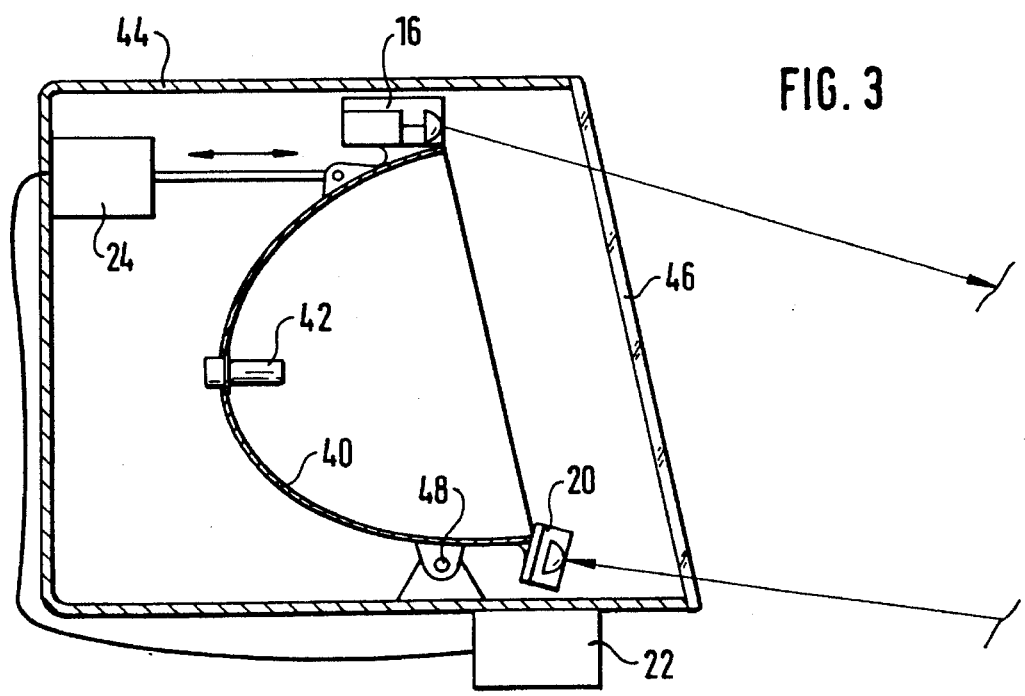
FIG. 3 is a view showing the use of the device for a headlight in accordance with a first embodiment.

The above described device for regulating the light width can be used for any headlights. FIG. 3 shows a first embodiment in which the headlights 10 have a conventional construction and each are provided with a reflector 40 with a light source 42 arranged in the reflector. The light source 42 can be an incandescent lamp or a gas discharge lamp. The reflector 40 is adjustably mounted in a housing 44 or in another holder, which is mounted on the chassis of the motor vehicle. The light outlet opening of the headlight 10 is covered with a light permeable cover plate 46 which can be formed as a smooth plate or provided with optical elements for influencing the light reflected by the reflector 40. The transmitter 16 is arranged on the headlight 10 so that during inclination changes of the motor vehicle, it performs the same movements as the headlight 10. In this way faulty adjustments of the headlight are avoided. Preferably, the transmitter 16 is integrated in the headlight 10. In other words it is arranged inside the headlight housing 44 or the holder and is coupled with a reflector 40 so that it follows the adjustment movements actuated by the adjusting device 24. The sensor 20 is also preferably integrated in the headlight 10. The evaluating device 22 can be arranged in any way, however, an arrangement as close as possible to the headlight 10 is advantageous for avoiding long electrical conductors. The part of the device composed of the transmitter 16, the sensor 20 and the evaluating device 22 for regulating the light width can be available for both headlights 10 or only for one headlight. Moreover, one adjusting device 24 can be associated with each headlight 10, or only one headlight and through the adjusting device 24 either the whole headlight 10 or only its reflector 40 can be turned about a horizontal axis 48. The adjusting device 24 can be driven hydraulically, pneumatically or electrically. In the electrical embodiment an electric motor or an electromagnet can be provided as a drive for it.

When the transmitter, the sensor, the evaluating device and the adjusting device are provided for only one headlight 10, 11 the adjustment of this headlight must be transmitted to another headlight, or in other words the other headlight must be adjusted in the same manner. For this purpose a mechanical coupling 25, formed for example as a rod, a pulling cable or the like, is provided between the adjusting device 24 and the other headlight. It is also possible with the one headlight to detect the adjustment actuated by the adjusting device 24 by means of a sensor device 27 and to adjust by the latter the adjusting device 29 of the other headlight so that the latter is adjusted in the same manner.

FIGS. 4–7 show a second embodiment of the headlight 110, 111. The headlights 110, 111 have an external light producing unit 112 which also has a light source 114. The light producing unit 112 also has a reflector 119 formed as a hollow body for bundling the light emitted by the light source 114. Several light conducting elements 118 lead from the light producing unit 112 to the light distributing units 120, 121 of the headlights 110, 111, in which the light emitted by the light source 114 and in some cases reflected by the reflector 119 enters. The light distributing units 120, 121 of the headlights 110, 111 are each composed of several light distributing units 120a–120d or 121a–121d. Each light distributing unit 120a–120d or 121a–121d is a lens element 122a– 122d and is associated with an end of the light conducting element 118a–118d. The light exiting the associated light conducting element 118a–118d is detected by each lens element 122a–122d and deviated during its passage through the lens element. The light outlet opening of the light distributing unit 120, 121 is closed by a light permeable cover plate 125 which can be formed as a smooth plate or provided with optical elements for influencing the light which passes through it.

Figure 4:
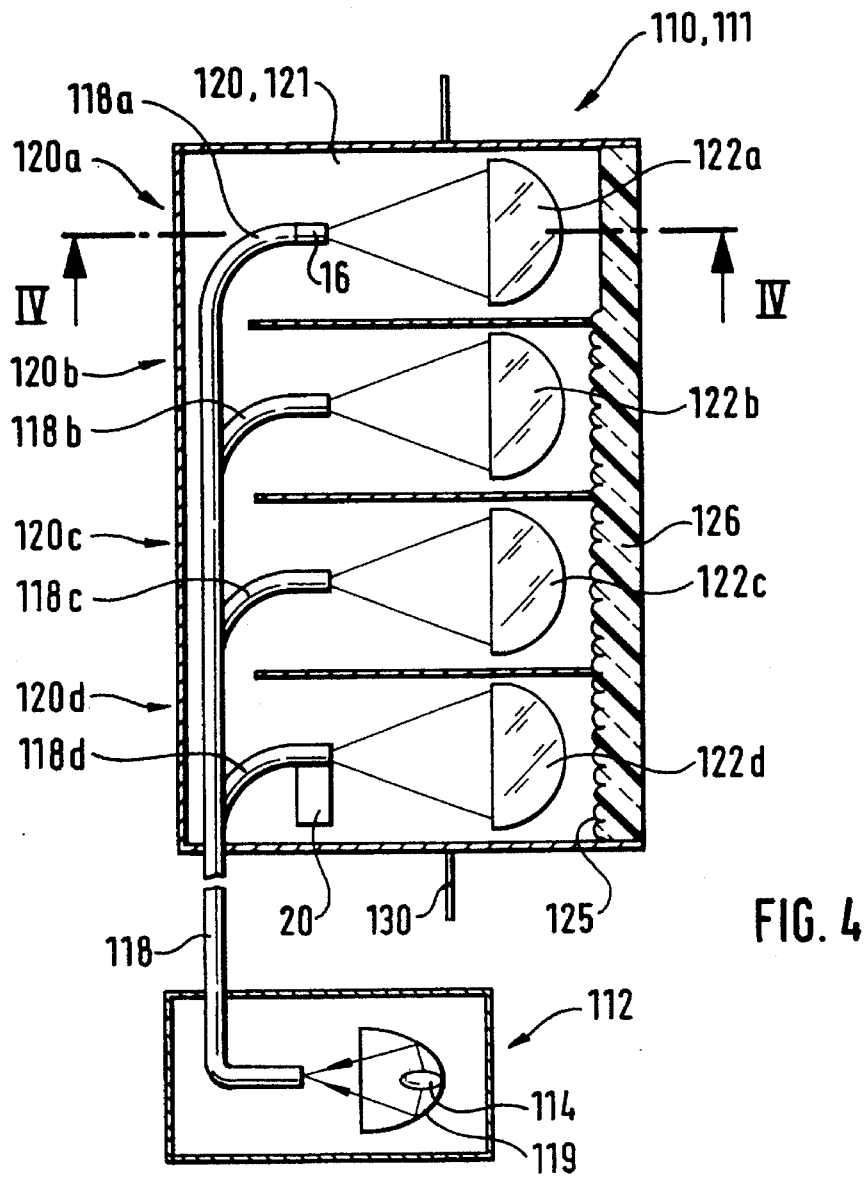
FIG. 4 is a view showing the use of the device with a headlight in accordance with a second embodiment.
Figure 4A:
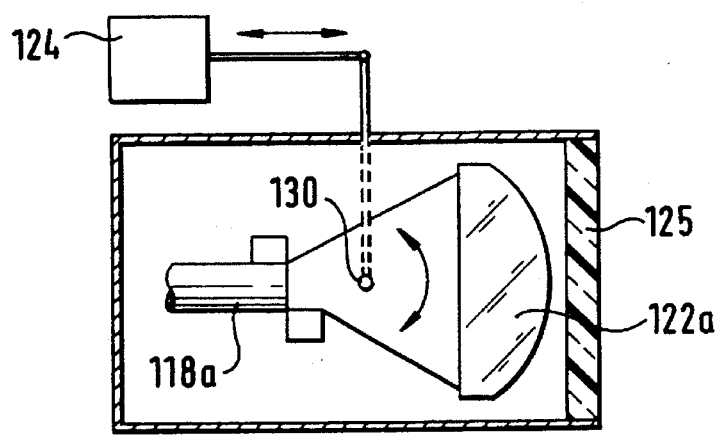
FIG. 4a is a view showing a vertical longitudinal section of the headlight of FIG. 4, taken along the line IV—IV in FIG. 4.
Figure 5:
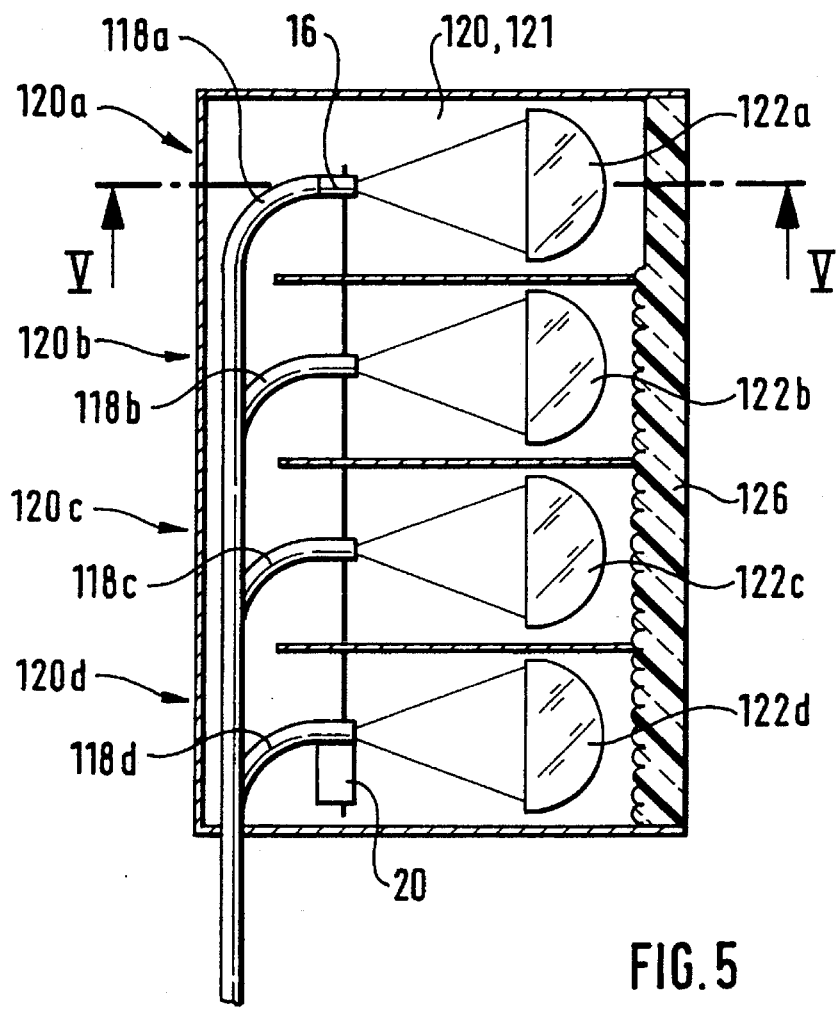
Figure 6:
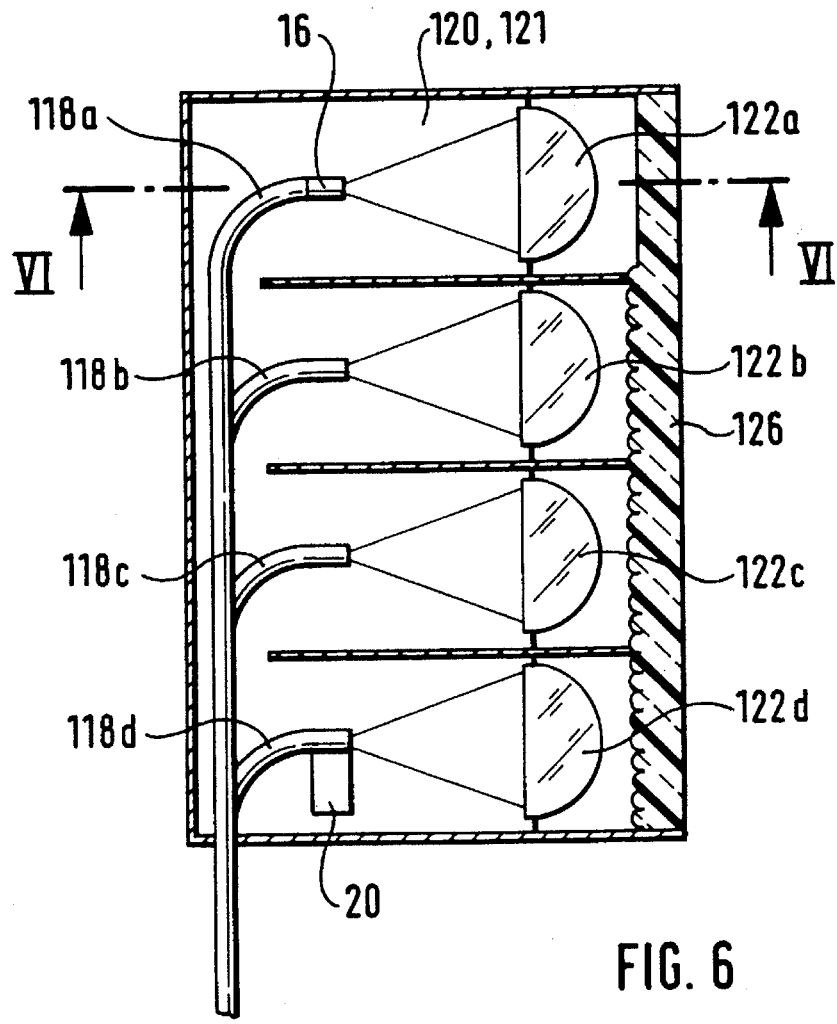

It is possible that the light distributing units 120a–120d are associated with the regions of the cover plate 125 with different optical elements. The lens elements 122a–122d and the optical elements of the cover plate 125 are formed so that the light which passes through them is deviated in a predetermined manner and distributed. Due to the superposition of the light originated from all light distributing units 120a–120d and 121a–121d a low beam light is produced. The transmitter 16 and the sensor 20 are arranged near the headlights 110, 111 as in the first embodiment. In the embodiments of FIGS. 4–6 the transmitter 16 and the sensor 20 are integrated in the light distributing unit 120, 121. For the transmitter 16 the lens element 122a of the light distributing unit 120a is utilized as a lens for bundling the radiation emitted by the transmitter, while for the sensor 20 the lens element 122d of the light distributing unit 120d is used as a lens for projecting the radiation reflected from the region 18 of the roadway. In the embodiment shown in FIGS. 4 and 4a the total light distributing unit 120, 121 is turnable about a horizontal axis 130 by the adjusting device 124 for changing the light width of the light beam exiting the light distributing units 120, 121.

Figure 5A:
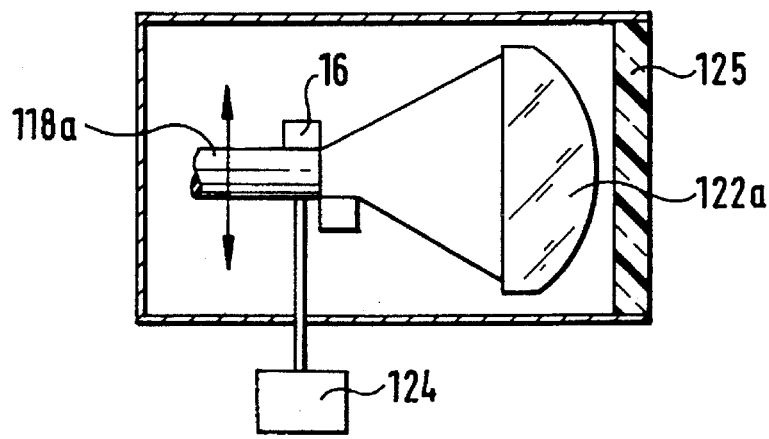
FIGS. 5a and 6a show the headlight in a vertical longitudinal section along the line V—V in FIG. 5 and along the lines VI—VI in FIG. 6.
Figure 6A:
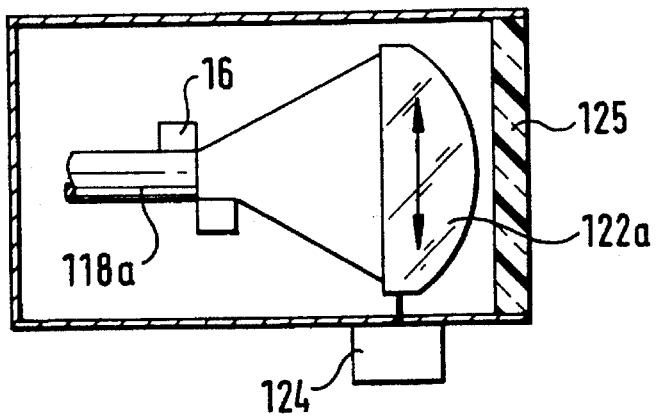

In the embodiment variant shown in FIGS. 5 and 5a the ends of the light conducting element 118 associated with the light distributing units 120, 121 is vertically movable by the adjusting device 124 for changing the light width of the light beam exiting the light distributing element 120. The transmitter 16 and the sensor 20 are moved together with the ends of the light distributing element 118. In the embodiment variant shown in FIGS. 6 and 6a the lens elements 122 are vertically movable by the adjusting device 124 for changing the light width of the light beam exiting the light distributing unit 120, 121. Since the lens element 122a simultaneously operates as an imaging optics for the transmitter 16 and the lens element 122d operates as an imaging optics for the sensor 20, the adjustment is transmitted to the transmitter 16 and the sensor 20 without further elements.

FIG. 7 shows a further embodiment variant for the headlights 110, 111 formed as described above. The transmitter 116 is integrated in this variant however not in the light distributing unit 120, 121 but instead is arranged outside of the latter. The electromagnetic radiation emitted by the transmitter 116 is supplied into a transmitting device 138, which is formed for example as a light conducting element, whose end is associated with the light distributing units 120, 121. The radiation exiting the transmitting device 138 is bundled by the lens element 122a associated with the light distributing unit 120a and exits the light distributing unit 120. This embodiment provides the advantage that the transmitting device 138 can be arranged with a small eccentricity to the light distributing unit 120a of the associated light conducting element 118. Thereby through the lens element 122a an especially good bundling of the radiation exiting the transmitting device 128 is possible and therefore a radiation spot 18 can be produced with a small extension.

In all previously described embodiments of the device for regulating the light width it is also possible to operate the transmittal 16 or 116 in a pulsed manner. In other words the transmitter can send not a continuous radiation but instead individual radiation pulses which follow one another. The sensor 20 and the evaluating device 22 are then operated synchronously with the transmitter 116, 118.

In the previously described embodiments of the headlights 10, 11 or 110, 111 it is possible that from both headlights 10 and 11 or 110 and 111 arranged on the vehicle the same light beams are emitted. It is however also possible that different light beams are emitted from the headlights 10, 11 or 110, 111 arranged on the vehicle. In FIG. 8 a measuring screen 150 located in front of the vehicle is shown, on which the regions illuminated by the headlights 10, 11 or 110, 111 are marked. The measuring screen 150 represents the traffic situation in front of the vehicle, which is illuminated during the real use of the vehicle correspondingly. The headlight 10 or 110 of the vehicle which is associated with the counter-traffic side or in other words the right traffic at the left side of the vehicle, emits a light beam which illuminates the measuring screen 150 in the region 152, which substantially is arranged only on the traffic side or in other words to the right of the center of the measuring screen 150. This region 152 is limited from above by a bright-dark limit 154 which raises from the center of the measuring screen 150 to the outer edge of the traffic side or in other words to the right. For the counter-traffic side, or in other words at the left, the region 152 is limited by a lateral bright-dark limit 155. The light beam emitted by the headlight 10 or 110 is therefore illuminated substantially only at the traffic side.

The headlight 11 or 111 facing away from the counter-traffic side or in other words right on the vehicle, the region identified as 158 is illuminated on the measuring screen 150. This region 158 extends both at the traffic side itself and also at the counter-traffic side and is limited from above by a substantially horizontal bright-dark limit 60. The raising bright-dark limit 154 and the horizontal bright-dark limit 160 contact each other substantially at the center of the measuring screen 150.

In a simplified embodiment, the above described device for regulating the light width is available only on the headlight 11, 111, by which both the traffic side and the counter-traffic side are illuminated, since another headlight 10, 110 illuminating only the traffic side cannot cause any blinding of the oppositely coming vehicle driver.

Figure 9:
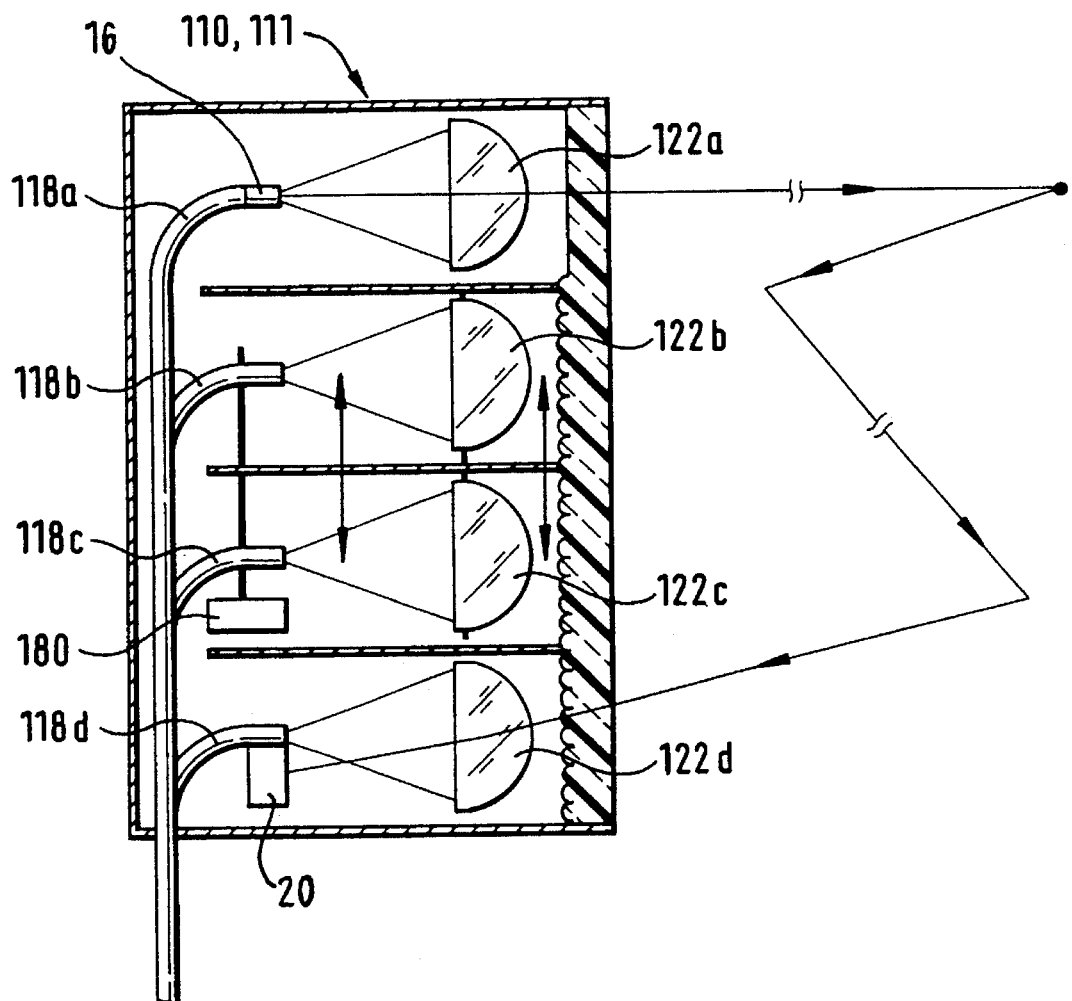
FIG. 9 is a view showing a further embodiment of a headlight with an additional adjusting device.

In the above described embodiment variants of the headlight 110, 111 of FIGS. 4–7 it is also possible in addition to changing the light width by the device for regulating the light width, to provide a change of the light beam emitted by the headlights 110, 111 independently from steering deviations of the vehicle. A change of the light beam emitted by the headlight 110, 111 is performed in the way that an increased illumination of the traffic situation in front of the vehicle is performed in the predetermined direction during the steering deviation. Such an embodiment is shown in FIG. 9. Here an adjusting device 180 is provided, by which the ends of the light conducting elements 118 and/or lens elements 122 can move in a horizontal direction. The adjusting device 180 is connected either with the parts of the steering of the vehicle or with a control device 182 which determines the steering deviation and controls the adjusting device 180 in dependence on it. The light conducting element 118a whose movement the transmitter 16 follows during a change of the light width, and the lens elements 122a and 122b which are used for the transmitter 16 and the sensor 20, are not moved by the adjusting device 180. It is also possible to provide the adjusting device 180 only for one headlight 110 or 111 of the vehicle. During the horizontal movement of the light conducting element 118 and/or the lens element 122, the traveling speed of the vehicle can be also considered with respect to the movement path and/or movement speed. Finally, the horizontal movement of the light conducting element 118 and/or the lens element 122 is performed during the actuation of the traveling direction indicator of the vehicle so that the traffic space in which a travel is to be performed is illuminated more.

It will be understood that each of the elements described above, or two or more together, may also find a useful application in other types of constructions differing from the types described above.

While the invention has been illustrated and described as embodied in a device for regulating light width of headlights of motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A device for regulating a light width of at least one headlight of a motor vehicle, comprising an adjusting device associated with said headlight; a transmitter which emits electromagnetic radiation to irradiate a region of a roadway located in front of the motor vehicle; an opto-electronic sensor which determines radiation emitted by said transmitter and reflected by the roadway and in dependence on the detected radiation produces signals; an evaluating device which processes the produced signals and controls said adjusting device for maintaining constant a light width of a light beam emitted by said headlight, said transmitter in addition to the light beam of the headlight emitting radiation and following an adjustment of the light width of the light beam emitted by said headlight which is provided by said adjusting device, so that the region irradiated by the radiation emitted by said transmitter on the roadway has a small extension and, with a correctly adjusted light width of the light beam emitted by said headlights is arranged at a predetermined distance from the motor vehicle, said evaluating device determining from the signals of said sensor a deviation of an actual distance of said irradiated region in front of the motor vehicle and, when a deviation is detected, controls said adjusting device for adjusting to said predetermined distance.

2. A device as defined in claim 1, wherein said transmitter is formed so that the electromagnetic radiation emitted by said transmitter has a different wavelength than a light emitted by said headlight.

3. A device as defined in claim 1, wherein said transmitter is formed so that the region irradiated by said transmitter is at least approximately points shaped.

4. A device as defined in claim 1, wherein said transmitter is integrated in the headlight.

5. A device as defined in claim 1, wherein said sensor is integrated in the headlight.

6. A device as defined in claim 1, wherein said sensor has an element which is sensitive for the radiation emitted by said transmitter and has an imaging optics by which the impinging radiation is directed to said element in dependence on its impinging angle in a different manner.

7. A device as defined in claim 1, wherein said sensor has several elements which are sensitive to the radiation emitted by said transmitter and has an imaging optics by which the impinging radiation is oriented to said elements individually in dependence on its impinging angle while said evaluating device determines which of said elements are impinged with the radiation.

8. A device as defined in claim 1, wherein the headlight comprises a light distributing unit and a light producing unit connected with one another by light conducting elements, said light conducting elements having ends associated with said light distributing unit being movable in a vertical direction by said adjusting device for changing the light width of a light beam exiting the headlight.

9. A device as defined in claim 1, wherein the headlight comprises a light distributing unit and a light producing unit connected with one another by light conducting elements, said light distributing unit having lens elements through which light exiting said light conducting elements passes and is deviated, said lens elements being movable in a vertical direction by said adjusting device for changing the light width of a light beam exiting the headlight.

10. A device as defined in claim 9, wherein said transmitter has a beam bundling device which bundles the radiation emitted by said transmitter and is formed as one of said lens elements of said light distributing unit.

11. A device as defined in claim 10; and further comprising a transmitting device through which the radiation emitted by said transmitter is supplied to said light distributing unit, said transmitting device has an end associated with said light distributing unit arranged so that the radiation exiting said end passes through said lens element and said end of said transmitting device is arranged at a small distance from an end of a light conducting element associated with said lens element.

12. A device as defined in claim 8, wherein said sensor has an imaging optics which is formed as said lens element of said light distributing unit.

13. A device as defined in claim 9, wherein said sensor has an imaging optics which is formed as said lens element of said light distributing unit.

14. A device as defined in claim 1, wherein the headlight comprises a light distributing unit and a light producing unit connected with one another by a light conducting element, said light distributing unit being adjustable as to its inclination by said adjusting device for changing the light width of the light beam exiting said light distributing unit.

15. A device as defined in claim 1; and further comprising a reflector provided in the headlight and a light source arranged in said reflector, said adjusting device adjusting said reflector as to its inclination for changing the light width of the light beam exiting the headlight.

16. A device as defined in claim 1 for the motor vehicle provided with at least two headlights, wherein said transmitter, said sensor and said evaluating device being provided for only one of the headlights; and further comprising a mechanical coupling connecting one of the headlights with another of the headlights so that said adjusting device adjusts one of the headlights and its adjustment is transmitted to another of said headlights.

17. A device as defined in claim 1 for the motor vehicle having at least two headlights, said transmitter, said sensor and said evaluating device being provided for only one of the headlights; and further comprising a sensor device by which an adjustment of one of the headlights by the adjusting device is detected and transmitted to another such adjusting device associated with another of the headlights.

18. A device as defined in claim 1, wherein said transmitter and said sensor are formed so that said transmitter operates with pulses and said sensor operates synchronously with said transmitter.

19. A device as defined in claim 1 for a motor vehicle having at least two headlights, wherein one of the headlights is arranged on a motor vehicle for a counter-traffic side and illuminates only a traffic side while another of the headlights is arranged on the motor vehicle so that it faces away from the counter-traffic side and illuminates at least the counter-traffic side, the arrangement for controlling the light width being associated only with the headlight which illuminates at least the counter-traffic side.

\* \* \* \* \*